United States Patent [19]

de Miranda Pinto

[11] Patent Number: 4,917,398
[45] Date of Patent: Apr. 17, 1990

[54] BICYCLE TRAINING HANDLE

[75] Inventor: Paulo S. de Miranda Pinto, San Diego, Calif.

[73] Assignee: Adele L. Bell Lee, San Diego, Calif.; a part interest

[21] Appl. No.: 348,900

[22] Filed: May 8, 1989

[51] Int. Cl.⁴ .............................................. B62H 7/00
[52] U.S. Cl. ..................................... 280/293; 280/298; 280/299; 280/301; 280/304; 280/47.131; 280/755
[58] Field of Search ............... 280/272, 293, 298, 299, 280/304, 304.5, 47.131, 755, 295, 301, 204, 242.1, 244

[56] References Cited

U.S. PATENT DOCUMENTS

| | | | |
|---|---|---|---|
| 3,437,351 | 4/1969 | Newbern | 280/205 |
| 3,595,599 | 7/1971 | Black | 280/282 |
| 3,650,544 | 3/1972 | Cassell | 280/293 |
| 4,730,840 | 3/1988 | Goldmeier | 280/210 |
| 4,733,880 | 3/1988 | Wilhelm | 280/244 |

FOREIGN PATENT DOCUMENTS

| | | | |
|---|---|---|---|
| 2924798 | 1/1981 | Fed. Rep. of Germany | 280/293 |
| 0432825 | 12/1911 | France | 280/293 |
| 2600963 | 1/1988 | France | 280/293 |

Primary Examiner—Charles A. Marmor
Assistant Examiner—Mitchell Bompey
Attorney, Agent, or Firm—Henri J. A. Charmasson

[57] ABSTRACT

A handle device for bicycles provides an adjustable rider training support point for training helpers. A handle and extension member is pivotally mounted to the rear axle and the pivoting motion conveniently places the handle proximate to the rider, avoiding the extraneous moments and forces experienced by present day fixed handles. The handle is allowed to pivot in the plane of wheel rotation, but the device is fixed in position when the optimum position is achieved. An alternate configuration limits pivoting motion to within a specific range. This allows convenient pushing, pulling and sideways support when the bicycle is at rest or being ridden. The handle is also mounted on telescoping members to conveniently adjust the handle height. The range of motion is also adjustable by a telescoping frame support or a fixture having tapered stops attached to the frame of the bicycle.

6 Claims, 3 Drawing Sheets

BICYCLE TRAINING HANDLE

FIELD OF THE INVENTION

This invention relates to bicycles and devices to assist persons learning to ride bicycles. More specifically, the invention relates to handle, training wheel and other attachments to bicycles which assist children or adults beginning learning how to ride a bicycle.

BACKGROUND OF THE INVENTION

The primary objectives of a bicycle training device are to: allow some bicycle riding skills to be practiced by a trainee; prevent injury to the trainee during training, practice or improper bicycle operation; and provide a training environment allowing representative trainee and bicycle movements and interactions. If the training device is attached to an actual bicycle, it should be small and light weight so that it will not interfere with normal rider and bicycle balance, rider entry and exit or rider vision. It should also be rugged in construction, allow attachment of containers, flags or related devices, pleasing in appearance and low in cost. It should also be adaptable to various bicycle sizes and designs, and cooperate (or at least not interfere) with other training devices or attachments. A minimum of effort to install and remove the device is also desirable.

Most of the current training devices may do one of these objectives well, but other objectives poorly or not at all. Several types of training devices are known.

Training wheels are a common method to first introduce a child to a bicycle. The training wheels convert the unstable (at rest) two wheeled bicycle into a relatively stable four wheeled vehicle, allowing the child or other trainee to become accustomed to the position and feel of the bicycle with out the risk of falling. The training wheels typically include a pair of outboard wheels mounted on a training wheel support members which are attached to the rear portion of the frame. The support members are typically clamped proximate to the rear axle of a bicycle. Training wheels allow the trainee to practice pedaling, starting and stopping, and handlebar steering.

However, training wheels tend to prevent rider training in balance movements. Transport, access and use tend to be cumbersome. The training wheels also increase the riding clearance required, prevent normal turning at speed and can impede a non-riding but adjacent training person or helper trying to assist in the training. Unless removed, the training rider cannot experience the proper balance and normal maneuvers required to properly ride the bicycle.

Fixed devices attached to the bicycle for grasping by non-riding helpers are also known. One example is a "push bar" illustrated in U.S. Pat. No. 4,730,840. The push bar is welded or otherwise firmly attached to a rear portion of the frame to allow a non-rider to push forward and hold back the training rider, and to also keep the trainee upright when required (i.e., prevent the trainee and bicycle from falling sideways).

This fixed handle approach is not easily removable when the training period ends and is also specific to a given frame design, i.e., it is not interchangeable with other types and sizes of bicycles. It may be placed at a convenient position for push starting a training rider, but this position may not be convenient to allow the training non-rider or helper to stand erect while running alongside. Rear placement of the push bar may also not allow convenient support by the helper if used in conjunction with training wheels, requiring removal of the training wheels prior to use of the push bar. If the helper forgets and the training wheels are not removed, the training helper can trip over the projecting training wheels, injuring the helper and the trainee.

In another approach is a projection from the rear of the bicycle seat. One example is shown in U.S. Pat. No. 3,595,599. The rear portion of the seat or rear seat support could be used as a "push bar".

However, this approach has similar limitations as to the non-removability, non-interchangeability, relatively fixed position, and the separate need to remove training wheels. Because the seat projection's position is related to the location of the rear seat, they may be inconvenient or incorrectly placed for proper support in the event of an imminent fall (i.e., grasping point may be placed too far back and supporting force may tend to lift the rear wheel, allowing the bicycle to pivot on the front wheel leading to the fall of the rider.

These prior approaches have other limitations. These are primarily related to the fixed position (in relationship to the bicycle seat or frame) and multiplicity of elements and designs required to attach and adapt to various different bicycle frame/seat shapes and sizes. To prevent the rider from falling sideways, the helper must firmly grasp the bar or projection while running alongside the moving bicycle. The act of running by the helper while firmly grasping an awkwardly located and fixed position bar or projection can add extraneous forces to the moving bicycle. An effort by the rider to balance these extraneous forces may be required. These extraneous and unrepresentative forces can detract and confuse the training of a child or other trainee. In order to prevent this confusion, some helpers do not firmly grasp the bar or projection, attempting instead to catch the falling bicycle, fixed bar or seat projection. These fixed bar/projection designs and multiple attachment problems cause added training and installation time, cost and added weight. The multiplicity of elements and fixed position problems also seriously detract from the reliability in preventing injury to children and proper bicycle riding training.

None of the prior art known to the applicant incorporates a handle for a non-riding helper without a fixed position attachment to the frame or seat. These prior approaches also requires extensive installation and removal hardware and procedures, or leaving the bar permanently attached.

What is needed is an easily removable training handle, which is adjustable to convenient angles and heights, and which can have a coordinated installation with removal of the training wheels.

SUMMARY OF THE INVENTION

The principal and secondary objectives of the invention are:

to provide a training handle which can be installed on a variety of different bicycle frames and at different positions;

to provide an adjustable and convenient bicycle training handle which does not add significant forces or impede riding balance when firmly grasped;

to allow easy installation concurrent with training wheel removal; and to allow the removable attachment of other devices to the bicycle.

These and other objectives are achieved by a pivotally mounted handle attached to the rear axle support of a bicycle. The handle is allowed to pivot in the plane of wheel rotation until the optimum position is achieved, and is normally fixed in this selected position. The pivoting motion can also be limited to a small range by a stop fixture or telescoping member attached to the frame. This allows convenient pushing and pulling (when handle is fixed in position or against the stops) and continuous sideways support at any handle position when the bicycle is at rest or being ridden. The handle can also mounted on telescoping members to adjust the handle height as desired. The range of motion can also be adjustable by tapered stops.

DESCRIPTION OF THE PREFERRED EMBODIMENT

Figure 1:
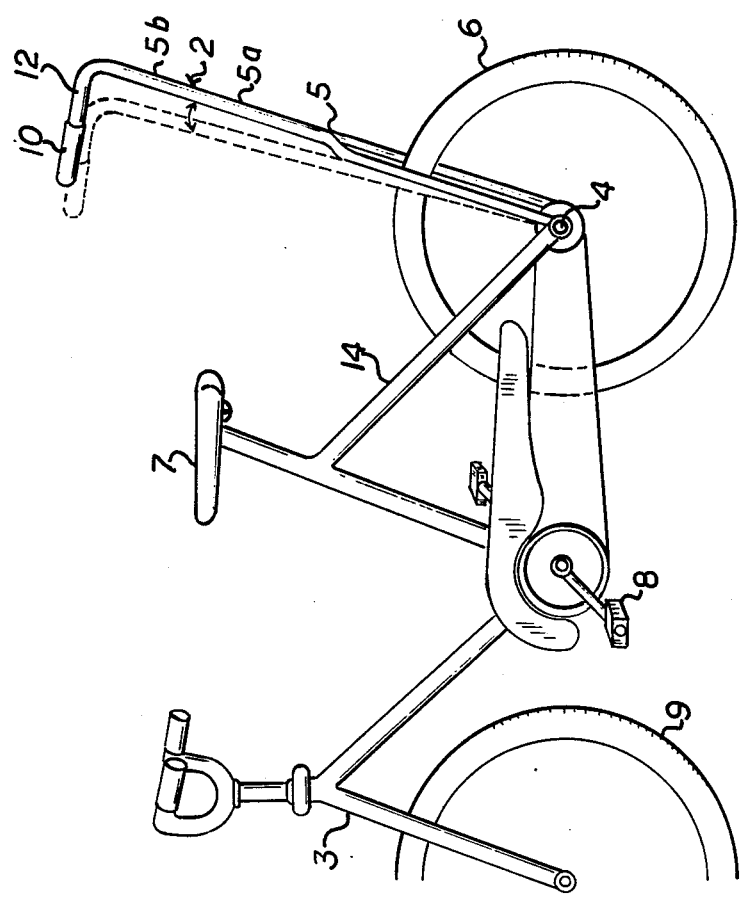
FIG. 1 shows a side view of a bicycle having an attached training handle.

FIG. 1 shows a side view of the preferred embodiment of the bicycle training device 2 attached to a bicycle 3. The device is pivotally attached to the rear wheel axle support 4. The pivotal attachment allows the extension element 5 to rotate around the rear wheel axle 4 in the plane of rotation of the rear wheel 6. A means for limiting or fixture (see FIG. 5) is provided to proximate the rear axle support to constrain positions the device may be pivoted to. The pivotal motion limits of extension element 5 (one limit position shown dotted for clarity) describe an angle "x". In the preferred embodiment, angle "x" is selected to allow attachment to a variety of bicycle frames and placement of the extension element 5 to be fixed in the optimum position. In an alternate embodiment, the attachment may allow a small degree of pivoting freedom during use to further isolate extraneous forces from the non-riding helper.

The extension element 5 of the training device also includes telescoping sections 5a and 5b. These sections are mounted to slide one within the other to allow the height of handle 10 to be adjusted. Notched or multiple ports and pinned connection between telescoping sections can be provided to maintain a selected height position.

The training device is located behind the training bicycle rider located on the seat 7, avoiding obstructing vision in the forward direction, operation of pedals 8, or front wheel 9 movement. The device 2 is provided with a handle 10.

Figure 2:
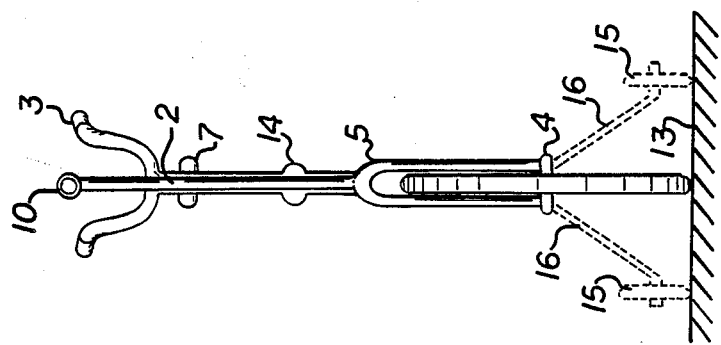
FIG. 2 shows a rear view of the bicycle being supported by a training helper.

FIG. 2 shows a rear view of a bicycle 3 being supported by a training helper 11. The helper stands adjacent to the bicycle, grasping the handle 10. The handle 10 includes a grip 12 which allow convenient grasping. In an alternate embodiment, stops (such as end caps) are attached to the handle and the grip 12 is slidably mounted to the transverse handle portion, allowing limited motion of the grip 12. In the alternate embodiment, the slidably mounted grip and pivotally mounted extension allow the helper to run alongside the bicycle 2 when ridden on the ground 13 while firmly grasping the grip without exerting any forward or side forces, until the grip 12 or extension 5 is abutting the limits of their respective travels. In the preferred embodiment, the optimum placement minimizes extraneous forces exerted by the non-riding helper.

In the event of an imminent fall, an upward force can be immediately applied by the non-riding helper 11 on the handle 10. Forces exerted by the helper 11 on grip 12 are transmitted to handle 10, which is transmitted through extension element 5 of the device 2 to the rear wheel axle 4. These axle forces are then transmitted through the bicycle frame 14 to seat 7 supporting the seated trainee (not shown for clarity). The proximity of the handle to the trainee insures that uprighting forces applied by the helper 11 act most directly on the trainee, exerting minimal extraneous forces or moments or loss of rear wheel traction.

Also shown (dotted for clarity) are training wheels 15 and training wheel support members 16 attached to the axle support 4. The training wheels 15 and support members 16 are shown dotted as they are normally not attached when the training handle 2 is attached and the trainee (not shown) seated on seat 7 is ready for training using the training handle 2. Both the training wheels and the training handle use a common point of attachment, so that removal of training wheels and installation of the training handle can be coordinated and simplified. A common fixture or clamp (see item 26 in FIG. 7) can be used to attach both the training wheels support members 16 and the training handle extension element 5 as shown. The training wheel support member 16 may also be common to the (i.e., form part of) the extension element 5 is still another embodiment. The training handle can be left on the bicycle permanently for individually positioning and training other trainees, or it may be removed when the training period ends.

Figure 3:
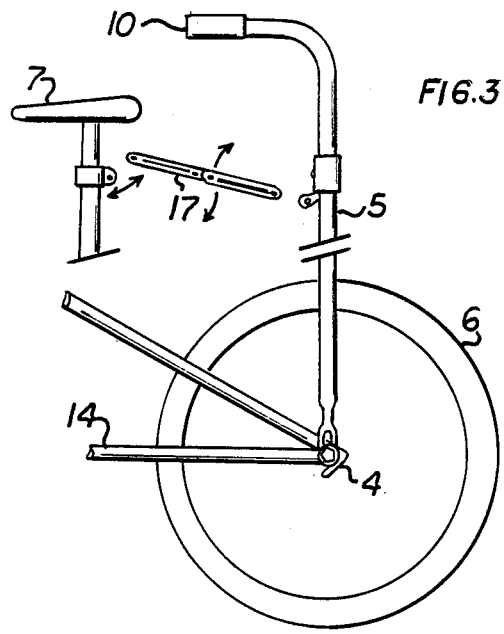
FIG. 3 shows a side view of an alternate training handle device having a telescoping frame support.

FIG. 3 shows an exploded side view of an alternate embodiment of a training handle device having a jointed or telescoping frame support 17. The frame support 17 attaches the extension element 5 to the frame 14 in the proximity of the seat 7. The jointed or telescoping construction of the frame support 17 allows the handle to be secured to a variety of bicycle frames and also allows a limited pivoting motion. The pivoting motion is used in the preferred embodiment to adjust the handle position to an optimum position prior to securing in place. An alternate configuration could also allow the handle 10 a limited range of movement during the training period.

Figure 4:
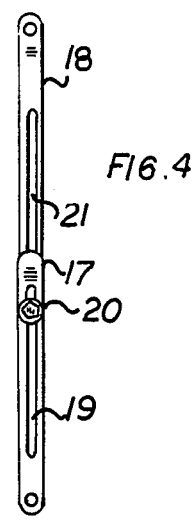
FIG. 4 shows a side view of the telescoping frame support.

FIG. 4 shows a side view of the telescoping frame support 17. The frame support 17 is composed of a first sliding member 18 and a second sliding member 19. The sliding members 18 and 19 are slotted and a bolt 20 slidably attaches the first and second sliding members. The limits of motion of the handle (see FIG. 3) are provided by the ends of the slots 21. In alternate configurations the members could be jointed or tubular telescoping members and the position not fixed during the training period.

Figure 5:
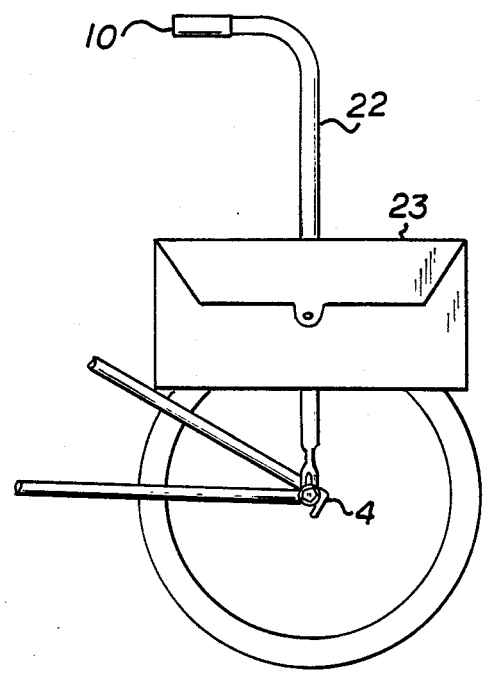
FIG. 5 shows a side view of a alternate combined safety handle and luggage carrier.
Figure 6:
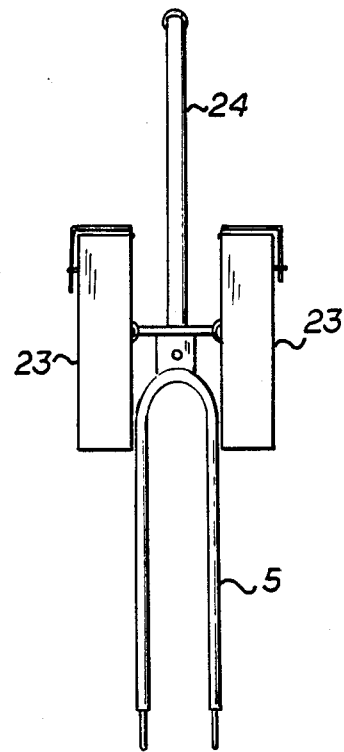
FIG. 6 shows a rear view of the combined safety handle and luggage carrier.

FIG. 5 shows a side view of a alternate combined safety handle and luggage carrier 22. The handle 10 and an extension member are again placed proximate to the rear wheel 6 and pivotally connected to the axle support 4, but the device also includes a pair of luggage carriers 23. The saddlebag type of luggage carriers can be permanently attached to the bicycle 2 as shown or can also be a removable attachment, as previously discussed in reference to training wheels FIG. 6 shows a rear view of the combined safety handle and luggage carrier. The split extension element 5 allows attachment to both sides of the axle support (see FIG. 5), and provide clearance for the rear wheel 6 (see FIG. 6). The handle segment 24 can be permanently or removably attached to the split extension element 5.

Alternate embodiments can provide for the attachment of other devices in addition to or instead of the luggage carrier. The other devices include warning flags, an additional adult or child seat, tool kits, locked containers, fluid containers, straps, lights, etc.

Figure 7:
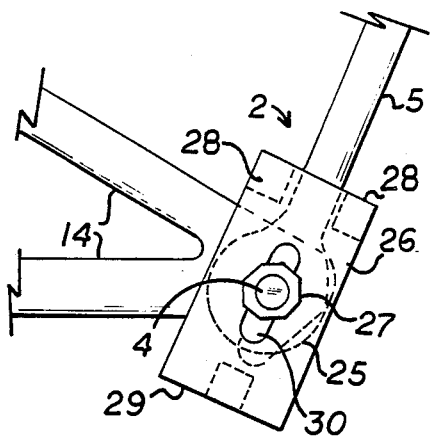
FIG. 7 shows a partial side view of the attached training device.

FIG. 7 shows a partial side view of a second alternate embodiment of a training device 2 attached to a bicycle. The extension elements 5 are pivotally attached at one end to the rear axle 4. The axle is attached to the bicycle frame 14, which terminates in a hook 25 around the axle 4. A means for limiting pivotal motion or fixture 26 is also provided proximate to the axle 4. A nut 27 threadably attached to the axle 4 is tightened to engage the fixture 26, extension 5, and the hooked end 25 of frame 14. Spokes of the wheel 6 (see FIG. 1) are not shown for clarity.

The fixture includes two upper protrusions 28 (shown dotted in this view) projecting into the pivoting plane of rotating of the extension element 5. The extension element 5 is shown abutting one of the two upper protrusions 28, establishing one edge of angle "x" (see FIG. 1). Rotation of the extension element 5 around the axle 4 until the extension element abuts the other protrusion 28 establishes the other edge of angle "x" (see FIG. 1). A lower protrusion 29 (shown dotted in this view) abuts the lower portion of the hooked termination 25 of the frame 14. Axle 4 projects through the fixture slot 30 in fixture 26.

Figure 8:
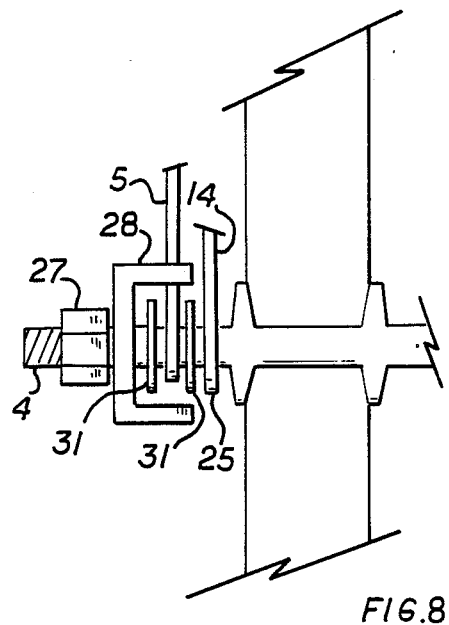
FIG. 8 shows a partial rear view of the attached training device proximate one side of the axle.

FIG. 8 shows a partial rear view of an alternate embodiment in an area proximate to one side of the axle 4. The nut 27 is tightened to force the fixture 26 towards the wheel 6 (only the hub and spokes shown for clarity) so that the upper protrusions 28 can engage the extension element 5 at the limits of pivotal motion "x" (see FIG. 1) and the lower protrusion 29 can engage the hooked end 25 of the frame. The lower protrusion also provides support for the extension element 5. Washers 31 allow relative motion between the extension element if desired.

Figure 9:
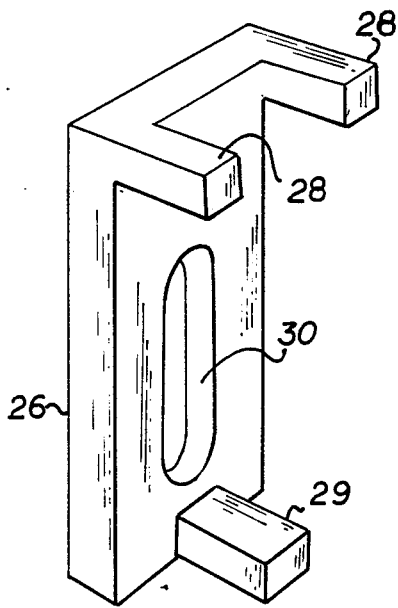
FIG. 9 is a perspective view of a fixture limiting motion.

FIG. 9 is a perspective view of fixture 26 of the alternate embodiment shown in FIG. 8. The upper protrusions 28 project from the primary plane of the fixture held towards extension member 5 by the nut 27 attached to the axle 4 (see FIG. 4) projecting through the fixture slot 30 in the primary plane. The lower protrusion 29 also projects from the primary plane.

The fixture slot 30 allows the fixture to be raised or lowered, changing the limits on the angle "x" (see FIG. 1). The protrusions may also be tapered and the number of washers 31 varied to further vary angle "x".

In still other alternative embodiments, the lower protrusion may be eliminated if the nut 27 is tightened against extension element 5, allowing lifting and other forces to be transmitted through the tighten nut attachment. If only very small pivoting action or is desired, the nut 27 may also be tightened and the washers 31 (see FIG. 8) can be eliminated. The extension member may also be segmented, rather than telescoping to achieve an adjustable height. Segments of the extension element may also be derived from a training wheel set to further coordinate installation and removal of training wheel and the training handle.

Figures 10, 11:
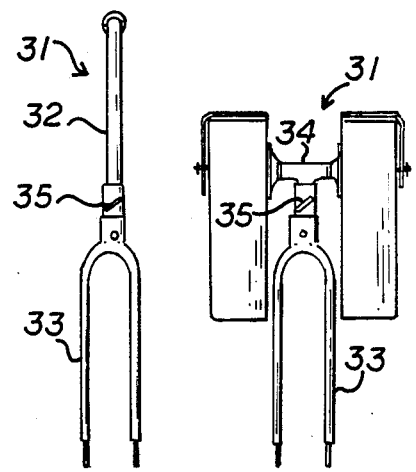
FIG. 10 shows a rear view of a replaceable safety handle.
FIG. 11 shows a luggage mounted in place of the safety handle.

FIGS. 10 and 11 illustrate another embodiment of the fixture 31 comprising a forked element 33 attachable to the rear wheel axle of a bicycle and detachable and substitutable handle 32 or luggage rack 34. It should be understood that other accessories such as a childs seat, flag pole etc. could be mounted in lieu of the handle 32 or the luggage rack 34 by plugging them into the socket and locking wing nut assembly 35 forming an integral part of the fork 33. In all other aspects the fixture 31 is similar to the training device described earlier.

The invention achieves the first objective of adaptability to many different bicycle frames and sizes by pivotally attaching elements to the rear wheel axle. The axle is essentially common to all bicycles and the pivotal attachment allows adjustment of the handle position to be proximate to the rider, independent of seat position, rider position, frame configuration and frame size. When compared to prior art push bars, the device is adaptable to nearly all bicycles, and can be removed and installed many times.

The invention achieves the second objective to not add extraneous forces or impede riding balance by having the grasped handle capable of pivoting around the rear axle. The pivoting motion is within the fore and aft plane and limited by stops to continuously allow the helper to apply side forces when needed to maintain balance at any pivotal position. When compared to the fixed prior art bars, extraneous fore and aft forces cannot be applied unless the handle is abutting one of the stops. Still further isolation of non-rider motions can be provided by a slidably mounted grip on the handle, allowing limited transverse motion of the grip.

The invention achieves the third objective to coordinate mounting with the removal of training wheels by mounting the device only to the rear axle support. No attachment to the seat or permanent attachment to the frame is involved. Training wheels are typically also mounted at this location, so that removal of the training wheels can be coordinated and accomplished at the same time as installation of the training handle device. Various clamps and hold down nuts may also be common to both training wheel and training handle installations. When compared to prior art fixed push bar installation, the push bar was firmly attached to the frame or seat. This requires separate (possibly permanent) installation of the push bar and separate (and uncoordinated) removal of the training wheels.

The invention achieves the fourth objective of allowing attachment of other devices by providing a convenient surface for the attachment of temporary or permanent luggage containers or other devices. The pivotal attachment would be fixed into position for the attachment of many of the other devices.

Other objectives are also met. Convenience is increased by the telescoping handle height adjustment. Rear placement and limited pivot motions insure the grip and handle is properly placed in any one of the pivoted positions to counteract an imminent fall by the trainee, and do not obstruct vision or operation of the bicycle. By telescopically lowering the height of the handle 10, or removing the handle segment portion of the device, it has minimal impact on balance or operation of the bicycle if attached but not used. Removal and installation is simply a matter of unscrewing one or two nuts 17, removing the fixture 16 and extension element 5, then replacing the nut 17.

While the preferred embodiment of the invention has been shown and described, and some alternative embodiments also shown and described, changes and modifications may be made therein within the scope of the appended claims without departing from the spirit and scope of this invention.

What is claimed is:

1. In combination with a bicycle having a frame including two wheel axles, a training handle device for a rider to be supported by a non-riding person exerting a force upon said device when required to prevent an unacceptable motion of said rider, said device comprising:
   a handle;
   a first extension element attached at one end to said handle;
   a means for pivotally attaching the other end of said first extension element to one of said axles;
   a means for limiting the pivotal motion of said first element to a specific range of positions, wherein the handle is proximate to the rider in at least one of said positions;
   wherein said extension element comprises at least two telescopically connected extension members; and
   wherein said means for limiting motion comprises a fixture attached to said bicycle proximate to said axle, said fixture having a protrusion abutting said extension element when said extension element is at one of the limits of pivotal motion.

2. The device of claim 1, wherein said protrusion is tapered.

3. The device of claim 2, wherein said limited range of positions are generally within a plane parallel to the plane of rotation of one of said wheels.

4. The device of claim 3, wherein said extension element also comprises telescoping members for adjustably varying the distance between said ends of said extension element.

5. The device of claim 4, wherein said handle has a major dimension in a direction perpendicular to the rotational plane of one of said wheels.

6. In combination with a bicycle having a frame including two wheel axles, a training handle device for a rider to be supported by a non-riding person exerting a force upon said device when required to prevent an unacceptable motion of said rider, said device comprising:
   a handle;
   a first extension element attached at one end to said handle;
   a means for pivotally attaching the other end of said first extension element to one of said axles;
   a means for limiting the pivotal motion of said first element to a specific range of positions, wherein the handle is proximate to the rider in at least one of said positions: and
   wherein said means for limiting motion comprises a fixture attached to said bicycle proximate to said axle, said fixture having a protrusion abutting said extension element when said extension element is at one of the limits of pivotal motion.

* * * * *